United States Patent [19]
Yoshida et al.

[11] Patent Number: 5,599,384
[45] Date of Patent: Feb. 4, 1997

[54] FUEL VAPOR TREATMENT DEVICE

[75] Inventors: Hiroyuki Yoshida, Sayama; Masashi Uchino, Kawagoe; Yuzi Chino, Yoshimi, all of Japan

[73] Assignee: Tsuchiya Mfg. Co., Ltd., Tokyo, Japan

[21] Appl. No.: 445,537

[22] Filed: May 22, 1995

[30]   Foreign Application Priority Data

Jun. 15, 1994   [JP]   Japan .................... 6-155465

[51] Int. Cl.$^6$ .................................. B01D 53/04
[52] U.S. Cl. ................ 96/143; 95/146; 96/147; 96/152; 123/519
[58] Field of Search ............ 95/143, 146; 96/137, 96/139, 140, 141, 142, 143, 147, 149, 152; 59/385.3; 123/519

[56]            References Cited

FOREIGN PATENT DOCUMENTS

1-159455   6/1989   Japan .

Primary Examiner—Jay H. Woo
Assistant Examiner—Duane S. Smith
Attorney, Agent, or Firm—Foley & Lardner

[57]           ABSTRACT

A fuel vapor treatment device adapted to prevent evaporative emission from an automotive vehicle has a casing formed of a plastic and defines therein a space filled with a fuel vapor absorbent. An end wall is sealingly connected to a first end of the casing and provided with a first pipe through which fuel vapor is charged to the space, and a second pipe through which the fuel vapor within the space is purged. A cover plate is sealingly connected to a second end of the casing. A partition member is integral with the casing and disposed within the space of the casing to define first and second chambers. The partition member includes first and second partition walls that are parallel with each other and form a predetermined space therebetween. The partition member further includes a first lateral wall to connect first ends of the respective first and second partition walls, and a second lateral wall to connect second ends of the respective first and second partition walls. The first and second chambers are in communication with each other through a passage located near the second end of the casing. Additionally, a portion at which the end wall is connected to the first lateral wall is allowed to be exposed to an outside of the casing, thereby facilitating the inspection of a gastight seal between the first end wall and the partition member.

9 Claims, 5 Drawing Sheets

FUEL VAPOR TREATMENT DEVICE

BACKGROUND OF THE INVENTION

1. Field of the Invention

This invention relates to improvements in a fuel vapor treatment device or vapor storage canister for temporarily storing fuel vapor to prevent evaporative emission in a vehicle.

2. Description of the Prior Art

An evaporative emission control system of an automotive vehicle generally includes a device or vapor storage canister that treats fuel vapor from a fuel tank and/or carburetor. The fuel vapor treatment device is provided at its one end with an inlet pipe connecting to a fuel tank so that fuel vapor is charged to the device, and an outlet pipe connecting to an air intake pipe forming part of the intake system of an engine so that the fuel vapor within the device is purged. The fuel vapor treatment device is provided at the other end thereof with an air pipe through which atmospheric air can be sucked into the device. A fuel vapor absorbent such as activated carbon, activated clay, silica gel is filled within the casing of the device. When the vehicle is in standstill or during fuel supply, fuel vapor in the fuel tank is introduced into the casing to be absorbed in the fuel vapor absorbent. The thus absorbed fuel vapor is purged from the fuel vapor absorbent with atmospheric air sucked into the casing under the vacuum in the intake system air intake pipe upon engine running, in which the purged fuel vapor is fed to the side of the air intake pipe.

It is a matter of general knowledge that the fuel vapor treatment device exhibits a high vapor absorbing performance (under the action of the fuel vapor absorbent) in case that the canister has a large length relative to a cross-sectional area. However, if the treatment device is considerably large in apparent length, it is inconvenient to use in cases where it is disposed in a narrow space or an engine room. In view of this, it has been proposed to improve the vapor absorbing performance without increasing the apparent length of the treatment device, as disclosed in Japanese Patent Provisional Publication No. 1-159455.

Figure 6:
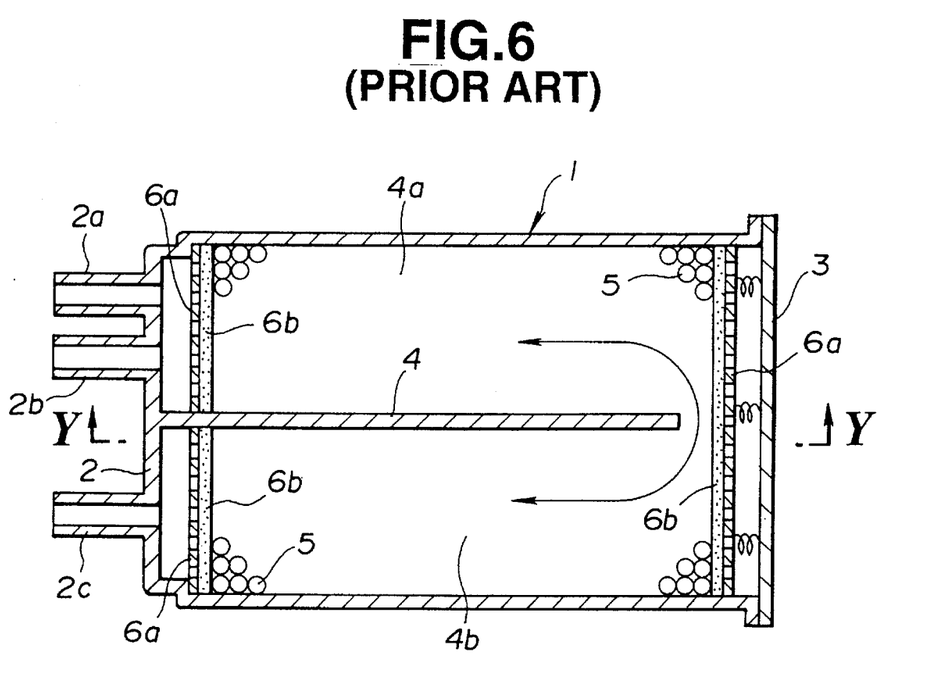
FIG. 6 is a transverse cross-sectional view of a conventional fuel vapor treatment device.
Figure 7:
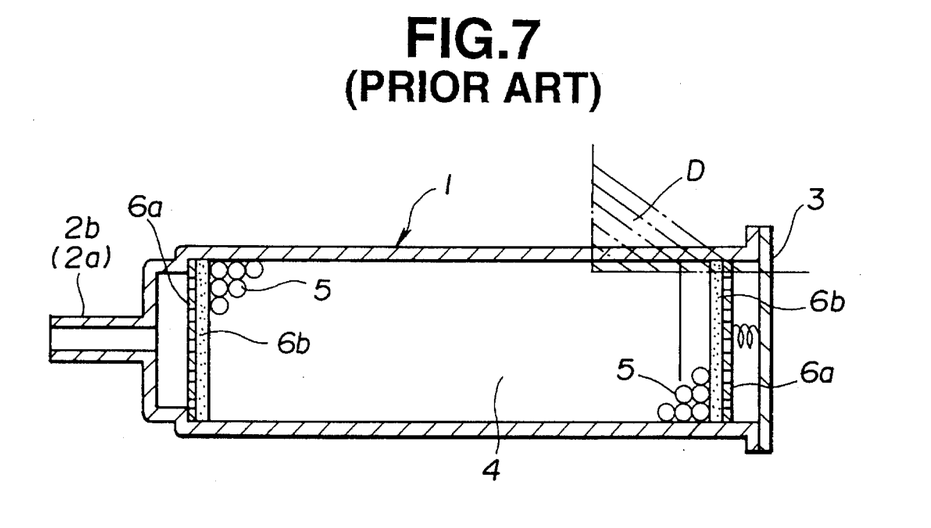
FIG. 7 is a cross-sectional view taken in the direction of arrows substantially along the line Y—Y of FIG. 6.

Such a fuel vapor treatment device is shown in FIGS. 6 and 7 and includes a casing 1 formed of a plastic and generally pipe-shaped. The inside space of the casing 1 is separated into two chambers 4a, 4b by a partition plate 4 integral with an end wall 2 of the casing 1 and has a length slightly smaller than the longitudinal dimension of the inside space of the casing 1. The end wall 2 is provided at its part closing the chamber 4a with an inlet pipe 2a and an outlet pipe 2b, and at its part closing the chamber 4b with an air pipe 2c. Additionally, a perforated support plate 6a and a filter member 6b are disposed inside the casing 1 and located at both the opposite end sections of the casing inside space in a manner to maintain a space between them and the end wall 2 or a cover plate 3 covering the open end of the casing 1. A fuel vapor absorbent 5 is filled under pressure in a space between the opposite filter members 6b, 6b. With this arrangement, when the fuel vapor from the fuel tank is charged to the treatment device, the amount of fuel vapor passing through the fuel vapor absorbent 5 is increased per unit area since the cross-sectional area of the treatment device is decreased by the partition plate 4. Additionally, the fuel vapor can be effectively absorbed in the fuel vapor absorbent 5 upon being passed through the two chambers 4a, 4b, which are contiguous in the U-shape.

However, drawbacks have been encountered in the above discussed conventional fuel vapor treatment device, as set forth below. That is to say, it will be understood that there is the necessity to partly form a depression on the surface of the casing 1 at a part near the cover plate 3 to avoid an interference of the treatment device with an obstacle D such as another apparatus or the like as shown in FIG. 7. In this case, it is impossible to fabricate a one-piece integral body of the casing 1 and the end wall 2 from view points of problems concerning fabrication and filling of the fuel vapor absorbent 5. More specifically, the one-piece integral body (a product) and a core used for fabrication cannot be drawn from a metallic mold after completion of the fabrication or plastic molding. Additionally, when the fuel vapor absorbent 5 is filled into the casing 1, a hollow space (not supplied with the absorbent) is unavoidably formed near the step-wise portion of the inner wall of the casing 1.

Figure 8:
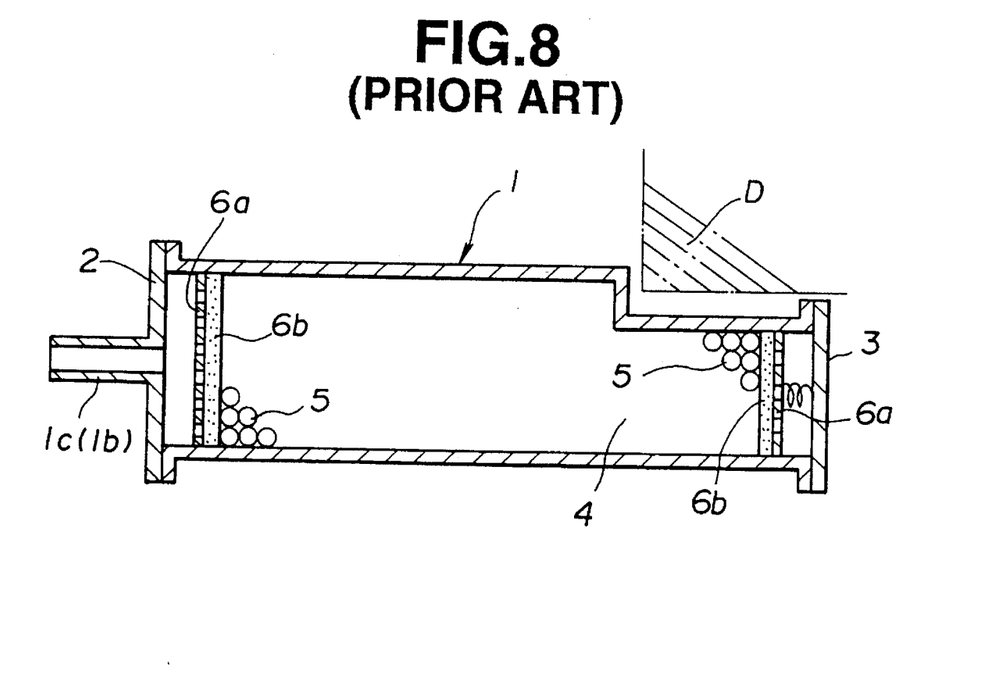
FIG. 8 is a vertical cross-sectional view of another conventional fuel vapor treatment device.
Figure 9:
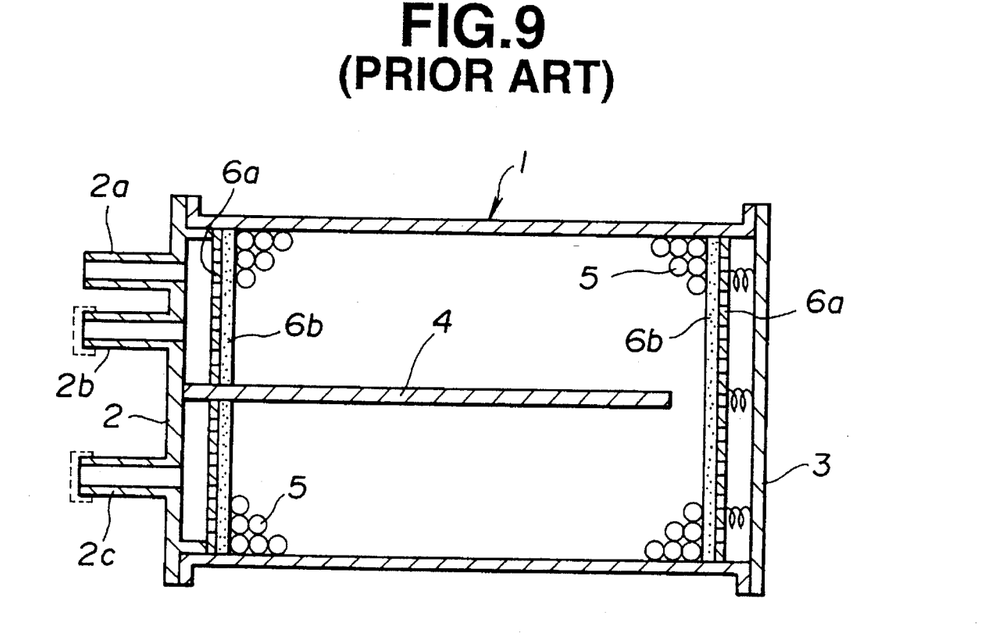
FIG. 9 is a lateral cross-sectional view of the fuel vapor treatment device of FIG. 8.

Accordingly, it is required to form or fabricate the casing 1 and the end wall 2 as two separate members as shown in FIG. 8, in which the end wall 2 is connected to the end face of the casing 1 under a frictional welding, after the fuel vapor absorbent 5, the support plate 6a and the like are supplied inside the casing 1. In this case, it is easy to connect the end wall 2 (as a separate member) to the end face of the casing 1 and to the end face of the partition plate 4. Additionally, it is also relatively easy to confirm a gas-tight seal under the connection of the end wall 2 with the casing 1. However, it is difficult to confirm a gas-tight seal under the connection of the end wall 2 with the partition plate 4.

The reason therefor will be discussed. The confirmation of the gas-tight seal can be accomplished by sinking the whole fuel vapor treatment device in water upon providing blind covers respectively to the outlet pipe 2b and the air pipe 2c and supplying suitable air through the inlet pipe 2a into the casing 1 followed by providing a blind cover to the inlet pipe 2a. If the end wall 2 is fully sealingly connected to the casing 1, no water bubble is produced. If there is a failure in gas-tight seal between the end wall 2 and the casing 1, water bubbles are produced thereby confirming a failed gas-tight seal.

However, concerning confirmation of the gas-tight seal between the partition plate 4 and the end wall 2, a connecting portion of the partition plate 4 and the end wall 2 is not exposed to the outside so as not to contact with water, and therefore leaking air merely stays within the casing even though air leak arises at the connection portion. As a result, the leaking air cannot escape into water thus never producing water bubbles. Thus, it is impossible to confirm as to whether the gas-tight seal is complete or not between the partition plate 4 and the end wall 2, thus resulting in producing inferior goods of the fuel vapor treatment device.

SUMMARY OF THE INVENTION

It is an object of the present invention to provide an improved fuel vapor treatment device that can overcome drawbacks encountered in conventional fuel vapor treatment device.

Another object of the present invention is to provide an improved fuel vapor treatment device of the type wherein the inside of a casing is separated by a partition member into two chambers that are in communication with each other, which treatment device is arranged such that a gas-tight seal can be easily confirmed at a connection portion between the partition member and an end wall, thereby effectively preventing inferior goods of the treatment device from being produced.

A further object of the present invention is to provide an improved fuel vapor treatment device of the type wherein the inside of a casing is separated by a partition member to define two chambers that are in communication with each other, which treatment device is constructed such that a connecting portion between the partition member and an end wall is exposed to the outside of the casing.

A fuel vapor treatment device of the present invention comprises a casing formed of a plastic and defining therein a space. An end wall is formed of the plastic and connected to a first end of the casing. The end wall is provided with a first pipe through which fuel vapor is charged to the space, and a second pipe through which the fuel vapor within the space is purged. A cover plate is formed of the plastic and connected to a second end of the casing. A partition member is disposed within the space of the casing and sealingly connected to the casing to define first and second chambers inside the casing. The partition member includes first and second partition walls that are parallel with each other and form a predetermined space therebetween. Each of the first and second partition walls extends in a direction from the first end to the second end of the casing. The partition member further includes first and second lateral walls. The first lateral wall extends laterally to connect first ends of the respective first and second partition walls. The second lateral wall extends laterally to connect second ends of the respective first and second partition walls. The second lateral wall is located near the second end of the casing. A fuel vapor absorbent is filled in the first and second chambers of the casing. A passage is defined between the second lateral wall of the partition member and the cover plate. The first and second chambers are in communication with each other through the passage. Additionally, a portion at which the end wall is connected to the first lateral wall is allowed to be exposed to an outside of the casing.

Thus, according to the present invention, the connecting portion between the partition member and the end wall is exposed to the outside so as to be brought into direct contact with water during inspection or confirmation of a gas-tight seal of the fuel vapor treatment device. As a result, the gas-tight seal at the abovementioned connecting portion can be easily confirmed although such a confirmation has been impossible in the conventional fuel vapor treatment devices. This makes it possible to prevent production and distribution of the inferior goods that will emit fuel vapor to atmospheric air. In case that the end wall includes two separate end walls so that the above-mentioned connecting portion is exposed to the outside through a clearance therebetween, changing the locations of the pipes at the end walls can be readily coped with. Otherwise, in case that the end wall is of the one-piece type and formed at its central portion with a vertical groove through which the above mentioned connecting portion is exposed to the outside, the external appearance of the product is made good while facilitating the fabrication and treatment of the end wall.

BRIEF DESCRIPTION OF THE DRAWINGS

In the drawings, like reference numerals designate like elements and parts throughout all the figures, in which.

DETAILED DESCRIPTION OF THE INVENTION

Figure 1:
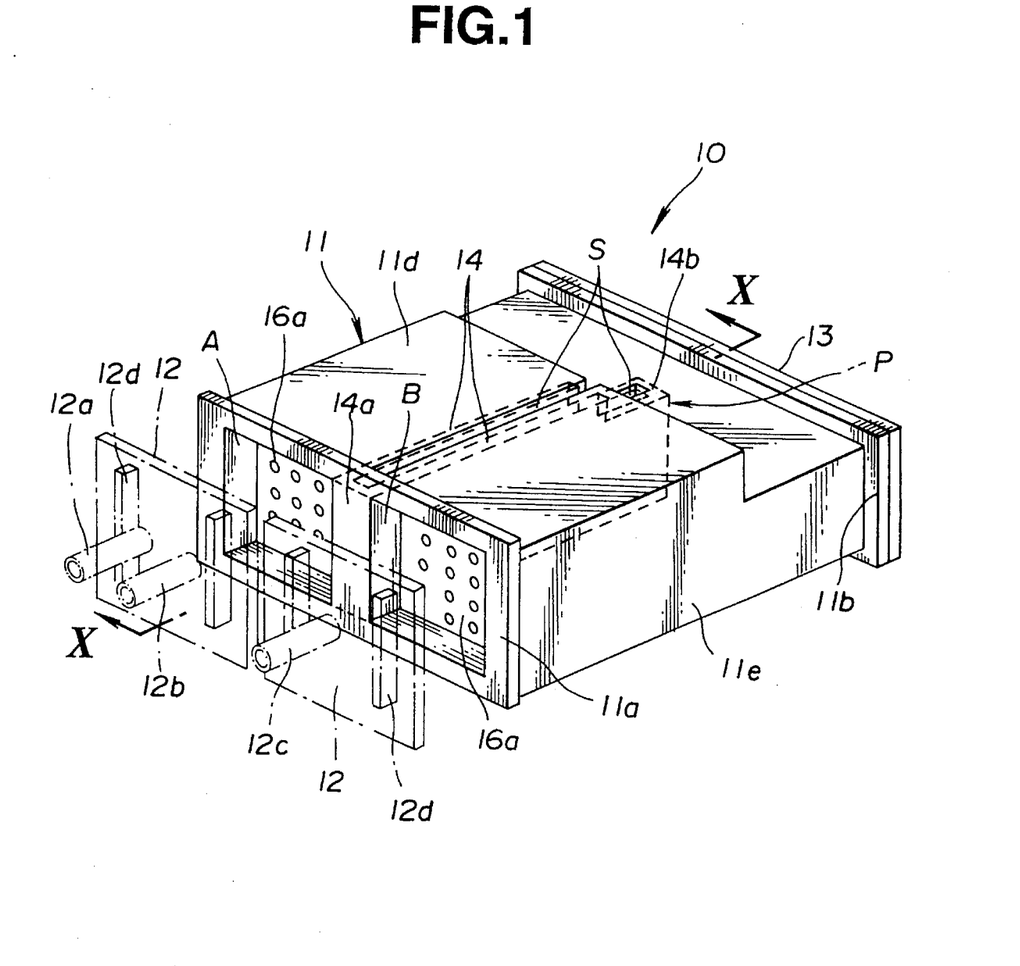
FIG. 1 is a perspective view (partly exploded) of an embodiment of a fuel vapor treatment device according to the present invention.
Figure 2:
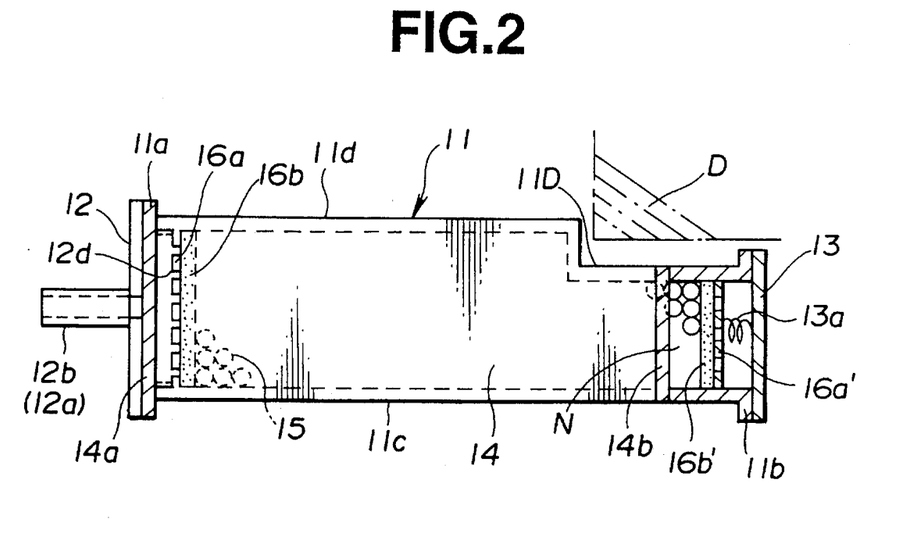
FIG. 2 is a cross-sectional view taken in the direction of arrows substantially along the line X—X of FIG. 1.
Figure 3:
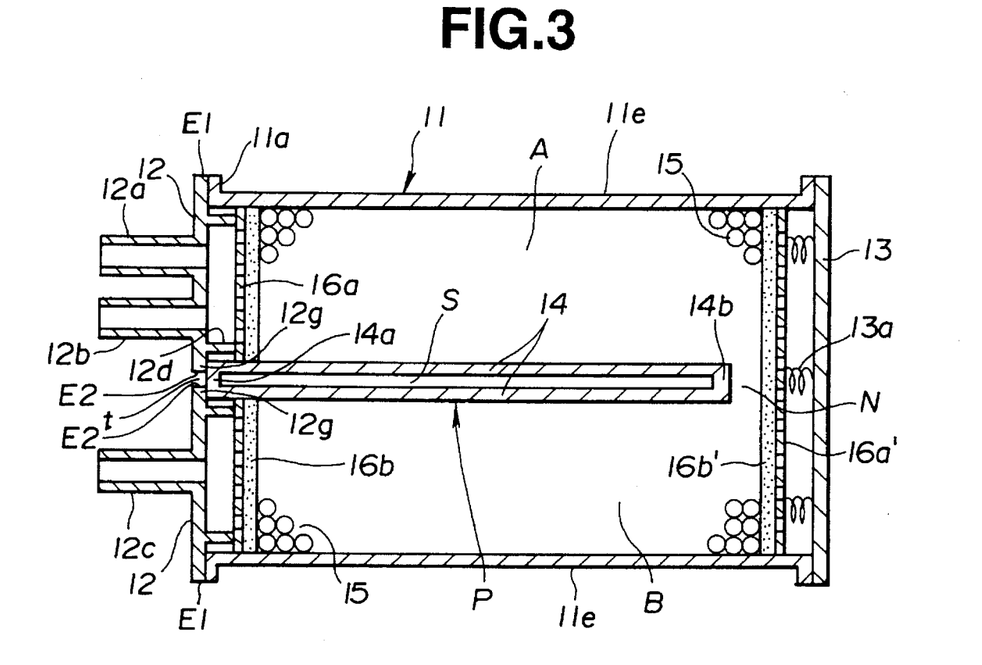
FIG. 3 is a transverse cross-sectional view of the fuel vapor treatment device of FIG. 1.

Referring now to FIGS. 1 to 3, an embodiment of a fuel vapor treatment device or vapor storage canister according to the present invention is illustrated by the reference numeral 10. The fuel vapor treatment device 10 in this embodiment is mounted on an automotive vehicle (not shown) and contains a fuel vapor absorbent 15 such as activated carbon or charcoal. The fuel vapor treatment device 10 forms part of an evaporative emission control system that prevents the escape of gasoline vapors from a fuel tank and a carburetor of an internal combustion engine though not shown, whether or not the engine is running. More specifically, evaporative vapors given off by gasoline (in the fuel tank and in the carburetor when the engine is not running) are piped to the fuel vapor treatment device 10 where they are absorbed. When the engine is restarted, fresh air is drawn through the fuel vapor absorbent 15. The fresh air removes the fuel vapor from the fuel vapor absorbent 15 and carries them into the engine to be burned in the combustion chamber, though not shown.

The fuel vapor treatment device 10 includes a casing 11 formed of a plastic such as nylon, polypropylene or polyethylene. The casing 11 is generally pipe-shaped and rectangular in cross section, which is perpendicular to the axis thereof. The front end (no numeral) of the casing 11 is opened except for its central part and provided with a front end wall 12. The rear end (no numeral) of the casing 11 is fully opened and provided with a cover plate 13. The casing 11 is formed at its upper section with a depression 11D that extends laterally and longitudinally to reach the rear end so that the upper surface of the rear section of the casing 11 is formed step-wise. The depression 11D is formed to avoid an interference of the fuel vapor treatment device 10 with an obstacle such as an apparatus disposed in a vehicle body on which the engine is mounted. The depression 11D may be located at the lower section of the casing 11.

Additionally, the casing 11 is integrally formed at its front end with a rectangular frame-like flange 11a, which radially outwardly extends, and at its rear end with a rectangular frame-like flange 11b, which radially outwardly extends. These flanges 11a, 11b facilitate securing of the front end walls 12 and the cover plate 13 respectively to the front and rear ends of the casing 11.

Two inner partition walls 14, 14 forming part of a partition member P are located inside the casing 11 and parallely extend from the front end toward the rear end of the casing 11. The inner partition walls 14, 14 are spaced from each other by a predetermined distance and have a length slightly less than that of the casing 11 so that the extreme end of each inner peripheral wall is spaced from the rear end of the casing 11. The inner partition walls 14, 14 are integrally connected at their front ends by a front lateral wall 14a and at their rear ends by a rear lateral wall 14b. The rear lateral wall 14b is smaller in height than the front lateral wall 14a. The front lateral wall 14a is in sealing contact with the end walls 12, 12, while the rear lateral wall 14b is spaced from the cover plate 13. The inner partition walls 14, 14 are located at the central position in the lateral or width direction of the casing 11 and vertically extend.

The lower end sections (no numerals) of the inner partition walls 14, 14 are integral with a bottom wall 11c of the casing 11. The upper end sections (no numeral) of the inner partition walls 14, 14 are integral with an upper wall 11d of the casing 11. As best shown in FIG. 2, the upper end section of each inner partition wall 14 is shaped generally corresponding to the side walls 11e of the casing 11. The lower end sections (no numerals) of the lateral walls 14a, 14b are integral respectively with the flange 11a and the bottom wall 11c, while the upper end sections (no numerals) of the lateral walls 14a, 14b are integral with respectively with the flange 11a and the upper wall 11d. In other words, the inner partition walls 14, 14 and the lateral walls 14a, 14b form part of the casing 11 and molded integral with the casing 11 during a fabrication process. As a result, a vertically and longitudinally extending space S is formed between the inner partition walls 14, 14 and passes through both the upper wall 11d and the bottom wall 11c of the casing, so that the casing 11 seems to be bifurcated in its front section near the flange 11a upon being formed with the vertically piercing space S. Accordingly, a sealed chamber or passage including first and second chambers A, B is formed within the casing 11 so that the chambers A, B are in communication with each other. The first and second chambers A, B are filled with the fuel vapor absorbent 15.

The front end walls 12, 12 and the cover plate 13 are formed of the same material as that of the casing 11. The front end walls 12, 12 are located side by side and slightly spaced apart from each other. In other words, the total lateral dimension of the front end walls 12, 12 is slightly smaller than the lateral dimension of the front flange 11a. The left-side front end wall 12 corresponding to the chamber A is provided at its front surface with an inlet pipe 12a through which the chamber A is in communication with a fuel tank (not shown) for the engine, and an outlet pipe 12b in communication with an air intake pipe forming part of an intake system of the engine. It will be understood that fuel vapor is charged into the chambers A, B through the inlet pipe 12a, while the charged fuel vapor is purged out of the chambers A, B through the outlet pipe 12b. The right-side front end wall 12 corresponding to the chamber B is provided with an air pipe 12c through which the chambers A, B in communication with atmospheric air to supply the chambers A, B with atmospheric air.

Each front end wall 12 is provided at its rear face with parallely and vertically extending two ribs 12d, 12d that support or press a perforated support member 16a and a filter member 16b located in the chamber A, B under a condition the front end wall 12 is fixedly secured to the frame-like flange 11a. The filter member 16b is formed of a nonwoven fabric or the like and located inside of the support member 16a. The filter member 16b is supported by the support member 16a formed of a perforated plate or a netting. The support member 16a is in contact with the ribs 12d, 12d. The fuel vapor absorbent 15 is filled inside of the filter member 16b.

The cover plate 13 is of a single piece and has the shape corresponding to the frame-like flange 11b at the rear end of the casing 11. A perforated support member 16a' same as one 16a and a filter member 16b' same as one 16b are located inside the casing 11 and elastically supported by a plurality of springs 13a secured to the front or inside surface of the cover plate 13 under a condition that the cover plate 13 is secured to the frame-like flange 11b at the rear end of the casing 11. The fuel vapor absorbent 15 is located inside the filter member 16b' and the filter member 16b. Under this condition, the rear lateral wall 14b is separate from the filter member 16b thereby forming a space or passage N in which the fuel vapor absorbent 15 is filled. It will be understood that the chambers A, B are in communication with each other through the passage N so that the sealed chamber (including the first and second chambers A, B) within the casing 11 takes the long U-shape.

The above fuel vapor treatment device 10 is assembled in the following manner:

First, the filter member 16b' and the perforated support member 16a' are inserted into casing 11 from the rear end of the casing 11 upon being put one upon another, and brought to predetermined positions. Subsequently, a predetermined amount of the absorbent 15 is filled into the chambers A, B of the casing 11 from the front end of the casing 11. Then, the filter members 16b and the perforated support members 16a are inserted into the casing 11 from the front end of the casing 11 and located into respective predetermined positions corresponding to the chambers A, B upon the corresponding filter and support members 16b, 16a being put one upon another. Next, the cover plate 13 is put to the rear end of the casing 11 and welded thereto under, for example, friction. Then, the two end walls 12, 12 are put to the front end of the casing 11 in such a manner that the outside (left and right in FIG. 1) end edges E1, E1 of the respective end walls 12, 12 are brought into agreement with the outside (left and right in FIG. 1) vertical edges of the flange 11a at the front end of the casing 11. Upon this, the two end walls 12, 12 are welded in position thereby completing the assembly of the fuel vapor treatment device 10.

During the above assembly, when each end wall 12 is secured to the front end of the casing 11, the inside (right and left in FIG. 1) end portions 12g, 12g of the respective end walls 12, 12 are welded to the lateral wall 14a integrally connecting the inner partition walls 14, 14, in which a clearance t as indicated in FIG. 3 is formed between the facing inside end edges E2, E2 of the respective end walls 12, 12 because the total lateral dimension of the end walls 12, 12 is smaller than the lateral dimension of the flange 11a at the front end of the casing 11. As clearly shown in FIG. 3, a central part of the front surface of the lateral wall 14a is exposed through the clearance t.

An inspection for a gas-tight seal for the thus produced fuel vapor treatment device 10 is conducted in a manner as set forth below.

First, to make the inspection for the connection between the cover 11 and the end walls 12, 12 and the connection between the cover 11 and the cover plate 13, blind covers (not shown) are provided respectively to the outlet pipe 12b and the air pipe 12c, and then pressurized air is suitably supplied through the inlet pipe 12a into the casing 11, followed by providing a blind cover to the inlet pipe 12a. Subsequently, the thus prepared whole fuel vapor treatment device 10 is sunk in water, in which air will leak and make water bubbles if there is a portion(s) not in gas-tight seal, between the casing 11 and the end walls 12 and/or between the casing 11 and the cover plate 13. Thus, a confirmation can be achieved as to whether the gas-tight seal of the fuel vapor treatment device 10 is completed or not. Additionally, if there is a portion(s) not in gas-tight seal, between each end wall 12 and the end face of the partition member P including the inner partition walls 14, 14, air will leak as water bubbles since the portion(s) is exposed through the clearance t and can be readily confirmed. Thus, the confirmation can be readily accomplished as to whether there is gas-tight seal between the partition member P and the end walls 12, 12.

In use of the fuel vapor treatment device 10, fuel vapor produced in the fuel tank during a standstill of the vehicle or during a fuel supply to the fuel tank is introduced through the inlet pipe 12a into the chamber A of the casing 11 and flows toward the rear end of the casing 11. Then, the fuel vapor passes through the passage N between the lateral wall 14b and the filter member 16b' and flows over the inner partition walls 14 to enter the chamber B thereby making a U-turn flow of the fuel vapor. The fuel vapor in the chamber B flows toward the front end of the casing 11, in which it is effectively absorbed in the fuel vapor absorbent 15. In this state, when the engine runs, atmospheric air flows through the air pipe 12c into the chambers B, A under the action of intake vacuum of the engine, in which the fuel vapor absorbed in the fuel vapor absorbent 15 is purged by the air flow and flows oppositely to the above to be sucked through the outlet pipe 12b to the air intake pipe of the intake system of the engine.

Figure 4:
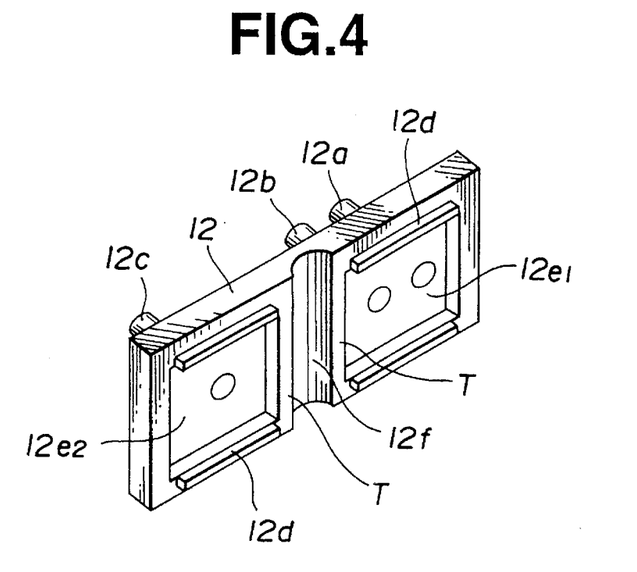
FIG. 4 is a perspective view of an end wall of another embodiment of the fuel vapor treatment device according to the present invention.
Figure 5:
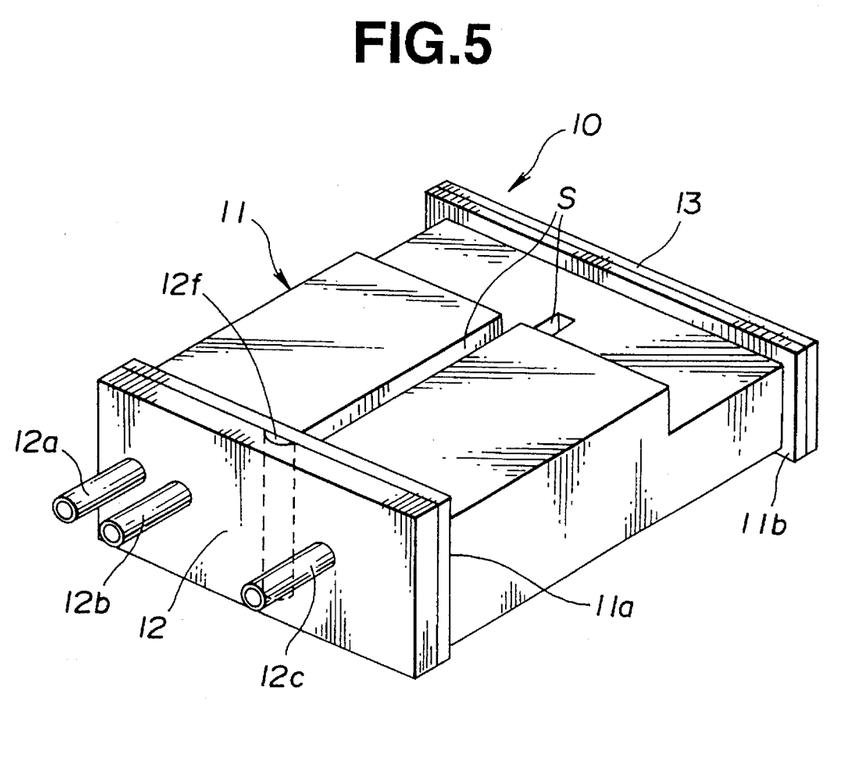
FIG. 5 is a perspective view of the fuel vapor treatment device of FIG. 4.

FIGS. 4 and 5 illustrate another embodiment of the fuel vapor treatment device 10 according to the present invention, which is similar to the embodiment of FIGS. 1 to 3. In this embodiment, the end wall 12 is of one-piece structure and has a lateral dimension same as that of the flange 11a at the front end of the casing 11. The peripheral section and the central section of the end wall 12 is formed slightly thicker than other sections thereof so as to be formed with rectangular depressions 12e1, 12e2 that respectively face the chambers A, B. The central section of the end wall 12 is formed with a vertical groove 12f that faces the lateral wall 14a and has a width smaller than that of the lateral wall 14a. Additionally, a pair of laterally extending ribs 12d are integrally formed with the rear or inner surface of the end wall 12 and located at the opposite sides of each depression 12e1, 12e2. The pair of ribs 12d are located inside each of the chambers A, B to support the support member 16a and the like with the end wall 12 secured to the front end of the casing 11. The end wall 12 is provided at its section corresponding to the chamber A with the inlet pipe 12a and the outlet pipe 12b, and at its section corresponding to the chamber B with the air pipe 12d.

The fuel vapor treatment device 10 of this embodiment takes the form shown in FIG. 5, in a condition that the end wall 12 is welded to the front end of the casing 11. In this state, the two opposite vertical thick portions T (shown in FIG. 4) located at the opposite sides of the vertical groove 12f are in sealing contact with the opposite side portions (not identified) of the lateral wall 14a connecting the inner partition walls 14, 14, leaving the vertical central portion (not identified) of the lateral wall 14a exposed. In other words, the vertical central portion of the lateral wall 14a is exposed through the vertical groove 12f. Accordingly, during inspection for a gas-tight seal of the fuel vapor treatment device 10, if there is a portion(s) not in gas-tight seal, between the end wall 12 and the inner partition walls 14, air will leak through the vertical groove 12f into water, forming water bubbles. As a result, a confirmation can be achieved as to whether the gas-tight seal is completed or not.

While the casing 11 has been shown and described as being formed generally rectangular in cross section, it will be understood that the casing 11 may be formed generally trapezoidal, circular, elliptical or the like-shape.

Although the end wall 12 has been shown and described as being formed with the ribs 12d while the cover plate 13 is provided at its inner surface with the springs 13a, it will be understood that conversely the end wall 12 may be provided at its inner surface with the springs 13a while the cover plate 13 may be formed with the ribs 12d; or otherwise both the end wall 12 and the cover plate 13 are provided singly with the ribs or the springs.

While the cover plate 13 at the rear end of the casing 11 has been shown and described as being formed separate from the casing 11, it will be appreciated that the cover plate 13 may be formed integral with casing 11.

What is claimed is:

1. A fuel vapor treatment device comprising:

a casing formed of a plastic and defining therein a space;

an end wall formed of a plastic and connected to a first end of said casing, said end wall being provided with a first pipe through which fuel vapor is charged to the space, and a second pipe through which the fuel vapor within the space is purged;

a cover plate formed of a plastic and connected to a second end of said casing;

a partition member disposed within the space of said casing and sealingly connected to said casing to define first and second chambers inside said casing, said partition member including first and second partition walls that are parallel with each other and form a desired space therebetween, each of said first and second partition walls extending in a direction from the first end to the second end of said casing, and first and second lateral walls, said first lateral wall extending laterally to connect first ends of said respective first and second partition walls, said second lateral wall extending laterally to connect second ends of said respective first and second partition walls, said second lateral wall being located near said second end of said casing;

a fuel vapor absorbent filled in said first and second chambers of said casing;

means defining a passage between said second lateral wall of said partition member and said cover plate, said first and second chambers being in communication with each other through said passage; and means for allowing a portion at which said end wall is connected to said first lateral wall, to be exposed to an outside of said casing.

2. A fuel vapor treatment device as claimed in claim 1, wherein said allowing means includes means defining a space between said first lateral wall and said end wall, said portion being exposed to the outside through said space.

3. A fuel vapor treatment device as claimed in claim 1, wherein said first lateral wall has a surface in alignment with the first end of said casing, wherein said end wall has a surface in sealing contact with said surface of said first lateral wall.

4. A fuel vapor treatment device as claimed in claim 1, wherein said partition member is located laterally central of said casing.

5. A fuel vapor treatment device as claimed in claim 1, wherein upper and lower ends of each of said first and second partition walls and each of said first and second lateral walls are respectively integral with upper and lower walls of said casing.

6. A fuel vapor treatment device as claimed in claim 1, wherein the plastic of said end wall and said cover plate is the same as that of said casing.

7. A fuel vapor treatment device as claimed in claim 1, wherein said end wall includes first and second end walls laterally separate from each other and connected to the first end of said casing, said allowing means including means for defining a clearance between said first and second end walls, said portion being exposed to the outside through said clearance.

8. A fuel vapor treatment device as claimed in claim 1, wherein said first and second end walls define respectively said first and second chambers.

9. A fuel vapor treatment device as claimed in claim 1, wherein said end wall is of an one-piece structure and connected to the first end of said casing, said allowing means includes means defining a groove facing said first lateral wall, said portion being exposed to the outside through said groove.

* * * * *